Aug. 28, 1962   O. C. BLOMGREN ET AL   3,051,010
SPEED CHANGING ASSEMBLY FOR POWER TAKEOFF SHAFTS
Filed July 15, 1960   2 Sheets-Sheet 1
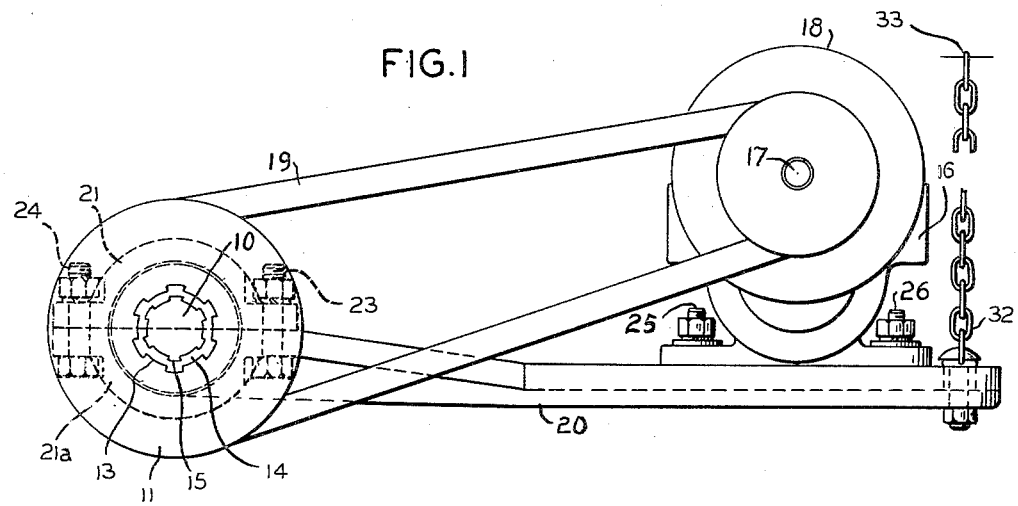
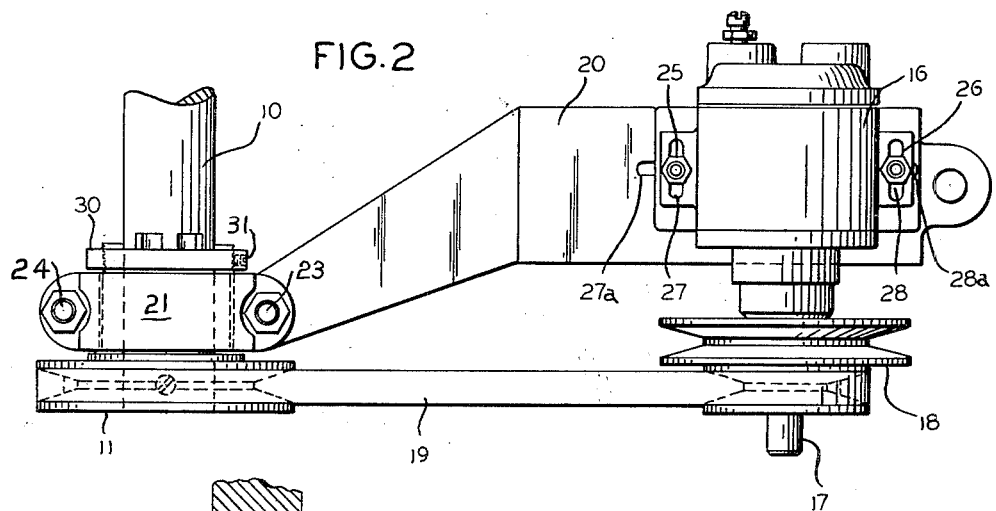
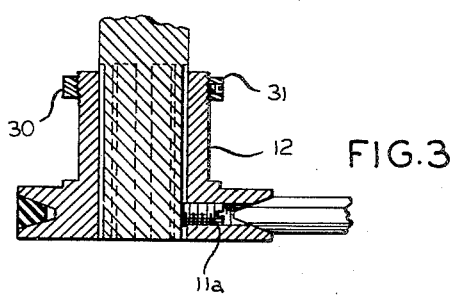
INVENTORS
OSCAR C. BLOMGREN
BY OSCAR C. BLOMGREN JR.
ATTORNEYS Aug. 28, 1962  O. C. BLOMGREN ET AL  3,051,010
SPEED CHANGING ASSEMBLY FOR POWER TAKEOFF SHAFTS
Filed July 15, 1960  2 Sheets-Sheet 2
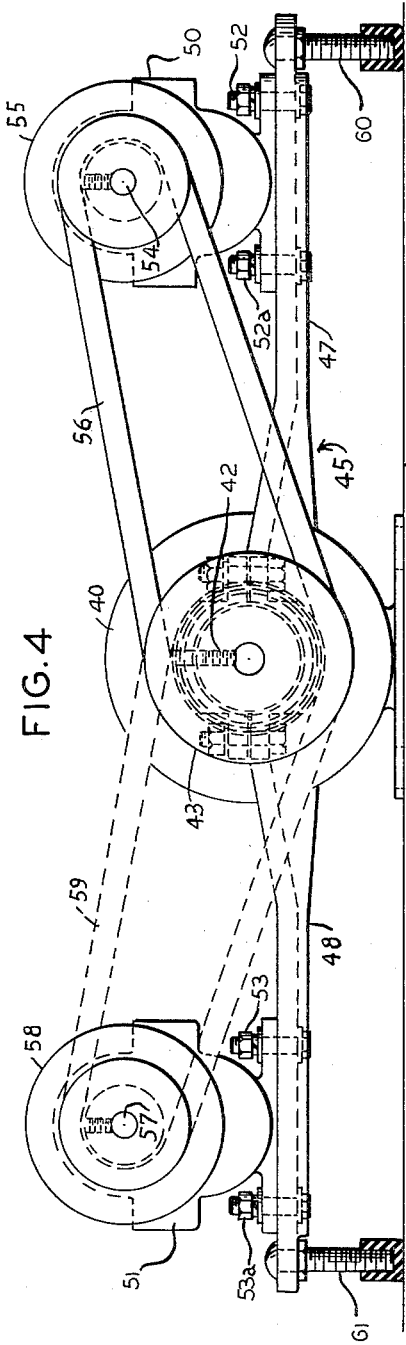
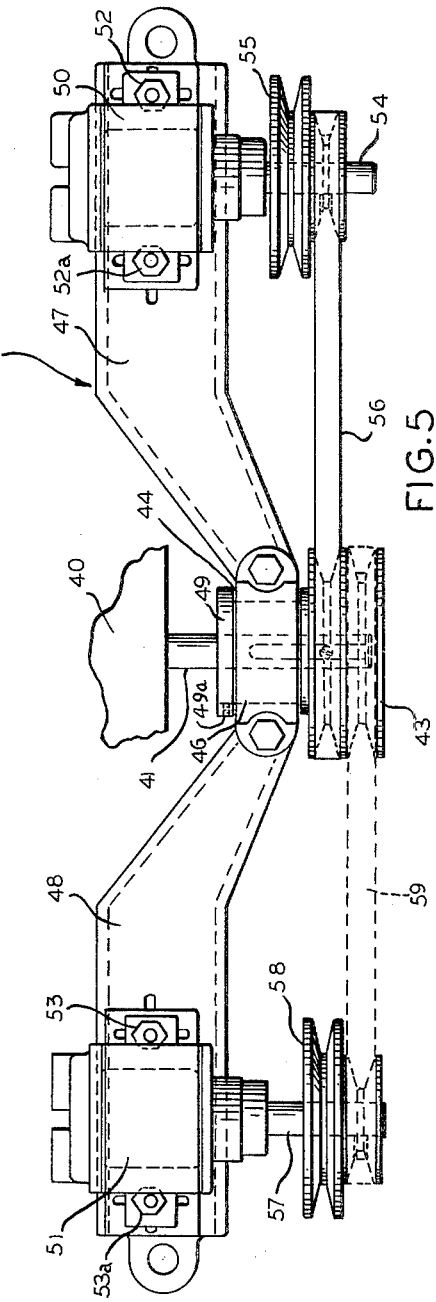
INVENTORS
OSCAR C. BLOMGREN
OSCAR C. BLOMGREN JR.
BY
ATTORNEYS

United States Patent Office 3,051,010
Patented Aug. 28, 1962

3,051,010
SPEED CHANGING ASSEMBLY FOR POWER TAKEOFF SHAFTS
Oscar C. Blomgren and Oscar C. Blomgren, Jr., both of 1303 Morrow Ave., North Chicago, Ill.
Filed July 15, 1960, Ser. No. 43,094
12 Claims. (Cl. 74—217)

This invention is concerned with power takeoff mechanisms. It is primarily directed to speed changing assemblies for use with power takeoff shafts of the type commonly found in the splined power takeoff shafts of farm tractors.

These power takeoff shafts have a serious limitation in that the speed of these shafts may be slower or faster than that desired for some tools. Changing the speed of the prime mover of course results in changing the speed of the power takeoff shaft, but changing the prime mover speed is impractical in many situations. While a change speed transmission may be permanently incorporated with the prime mover, such transmissions are ordinarily quite expensive, and usually provide only a small number of speed changes.

Accordingly, a major purpose of the present invention is the provision of an inexpensive speed changing mechanism that is so formed as to be easily attached to and detached from a power takeoff shaft which may be splined, keyed, squared or otherwise formed to receive a driven member fixed thereto, that is so formed that it easily permits a wide range of different speeds in use, and which has a mounting system such that problems of alignment between the driven members of the system are minimized with a preset bearing and alignment system.

In one sense the invention contemplates the use of a rotating shaft to support a stationary platform and at the same time produce motion of a tool, shaft, or mechanism supported on that platform.

Any number of different drives are possible, and a wide variety of speed changes are possible. A variety of different mechanisms may be supported on the platform to receive power from the rotating shaft.

Other purposes of the invention will be apparent from the following specification and claims when taken with the accompanying drawings in which:

FIGURE 1 is an elevation view of one embodiment of the invention;

FIGURE 2 is a plan view of the assembly illustrated in FIGURE 1;

FIGURE 3 is a sectional illustration of a portion of the assembly illustrated in FIGURES 1 and 2.

FIGURE 4 is an elevation view of another embodiment of the invention.

FIGURE 5 is a plan view of the embodiment illustrated in FIGURE 4.

Like characters designate like elements throughout the specification and drawings.

With particular reference now to the drawings and in the first instance to FIGURE 1, 10 generally designates a power takeoff shaft which in FIGURES 1, 2 and 3 may be taken as representative of a splined power takeoff shaft of the type commonly found on farm tractors or other transmissions. A pulley 11 is fixed to the splined shaft 10 and includes a bearing boss 12 fixed thereto on one side thereof. The boss 12 is preferably formed as an integral part of pulley 11 and may be a bearing itself or a bearing mount. The pulley 11 and boss 12 have an internal splined bore 13 extending therethrough within which may be fitted an adaptor sleeve 14 (omitted in FIGURES 2 and 3) having a smaller splined bore 15. The adaptor sleeve 14 enables use of the pulley on small sizes of power takeoff shafts. The splined bore 13 may be of a size such as to accommodate the larger splined shafts whereas different sizes of sleeves of the type designated at 14 may be slidably received within the splined bore 13 so as to accommodate the pulley to smaller sizes of shafts. Pulley 11 is fixed to the splined shaft 10 as by means of a set screw 11a which prevents axial displacement of the pulley 11 along the splined shaft 10.

The pulley 11 constitutes the driving member of a speed changing assembly which is adapted to drive a mechanism 16. Mechanism 16 is shown in the drawings as a pump, although it should be understood that the pump 16 is only representative of a large variety of mechanisms using a rotary power input shaft. The pump 16 includes a driven shaft 17 which is coupled to the driving pulley 11 by means of a multiple sheave pulley 18 which is driven from the pulley 11 by means of the belt 19.

In accordance with the invention, the pump 16 is fixed to and supported on the end of an arm 20 that extends generally radially from the shaft 10. The end of the arm defines the mechanism supporting platform. The arm 20 includes a split ring or collar, portions of which are designated at 21 and 21a and which are held together by bolts 23 and 24. The split ring or collar is swingably mounted on the boss 12 of pulley 11 so that the supporting arm 20 and pump 16 may swing about the axis of shaft 10.

The pump 16 may include a base that is bolted to the platform of the supporting arm 20 as by means of the bolts 25 and 26 with the mounting such that the pump may be adjusted toward and away from the shaft 10 and adjusted parallel to the axis of shaft 10. For example, the base of the pump may include slots 27 and 28 that extend parallel to the axis of shaft 10, whereas the arm 20 may include slots 27a and 28a that extend transversely to the slots 27 and 28. By extending the mounting bolts for the base of the pump and supporting arm 20 through these slots, the pump 16 is easily adjustable which adjustment in longitudinal directions may be desirable from the standpoint of aligning pulley 11 with a particular one of the several sheaves of pulley 18. Adjustment transversely or laterally of shaft 10 enables the operator to place the correct tension on belt 19.

In order to prevent movement of the arm 20 along the axis shaft 10, a lock nut 30 is threaded onto the outer end of the boss 12. The lock nut 30 may have suitable means such as a set screw 31 for insuring that the lock nut is held in position.

As thus constituted, the entire speed changing assembly is suspended on shaft 10 and is freely swingable about the axis of shaft 10. In order to prevent such swinging movement, which the weight of the assembly will ordinarily produce, a flexible member or chain 32 is fixed to the arm 20 and secured to a fixed support, as, for example, a portion of the tractor which is diagrammatically represented at 33.

FIGURES 4 and 5 illustrate the invention as applied to the power takeoff shaft of an electric motor 40. In FIGURES 4 and 5, the power takeoff shaft 41 of the motor 40 is provided with a flat for the purpose of receiving a set screw 42 of a rotatable member positioned on the shaft. In FIGURES 4 and 5, a multiple sheave pulley 43 is positioned on shaft 41 and fixed thereto as by means of the set screw 42. The pulley 43 includes a bearing boss 44 formed on one side thereof in a manner similar to the bearing boss 12 of FIGURES 1, 2 and 3. A tool supporting arm, generally designated at 45, includes a central portion 46 which is journalled on the bearing boss 44 and with arm portions extending laterally therefrom in opposite directions, which arm portions are designated at 47 and 48. Lock nut 49 is threaded onto the end of boss 44 so as to prevent axial movement of the tool supporting arm 45 along the boss 44. A set screw 49a may be used to hold lock nut 49 in position.

The arm portions 47 and 48 are used to support a plurality of tools which are represented by the pumps 50 and 51 which are positioned on platforms at the ends of the arm portions 47 and 48, respectively. The pumps 50 and 51 may be fixed to the arm portions 47 and 48 by means of the bolts 52, 52a, and 53, 53a. The pumps 50 and 51 may be mounted with the slot adjustments illustrated in FIGURE 2 so as to allow adjustment of the pumps in directions parallel to the axis of shaft 41 and in directions toward and away from the axis of shaft 41. Pump 50 has a driven shaft 54 which carries a multiple sheave pulley 55 fixed thereto and driven from the pulley 43 by means of the belt 56. The pump 51 has a driven shaft 57 to which is fixed a multiple sheave pulley 58 which is driven by a belt 59 leading from pulley 43.

As thus supported on the shaft 41, the tools or mechanisms are capable of a swinging movement about the axis of the shaft. In FIGURES 4 and 5 swinging movement is prevented by stops 60 and 61 which are carried by the outer ends of arm portions 47 and 48 and which are adapted for contact with a surface that is fixed with respect to the axis of the shaft 41, which surface may be the supporting surface for the motor 40 and designated at 62. The stops 60 and 61 may be adjustably mounted in the arm portions 47 and 48 and may take the form of threaded bolts which are extensible with relation to the arm portions 47 and 48.

In lieu of the single arm shown in FIGURES 4 and 5, the plural pumps may be supported on individual arms, each of which is journalled on the boss 44.

In each form of the invention disclosed herein the power takeoff and speed changing assembly is swingably supported on the power takeoff shaft itself. A swinging movement of the assembly, which is ordinarily produced by the weight of the assemblies themselves, is restricted only by the stop members, which in FIGURE 1 takes the form of the chain 32, while in FIGURES 4 and 5 the stop members take the form of bolts 60 and 61 which contact the supporting surface.

The assemblies are quickly attached to and detached from the power takeoff shafts. Simply fixing the drive pulley of the assembly to the power takeoff shaft and securing the lock nuts for the supporting arms and then positioning the stop makes the assembly ready for use. A wide variety of speed changes may be provided by employing several sheaves of different diameters on the power takeoff shaft and the driven shaft of the tools.

Different forms of mechanisms may be attached to and detached from the supporting arms 20 and 45 in accordance with the desires of the user.

In each form of the invention, the driving member and power takeoff shaft take at least a portion of the weight of the assembly, the remaining position being taken by the stop means. Any torque on the supporting arms, which may be produced by rotation of the pulley bosses within the collars of the arms, is overcome by the stops, in the event the direction of rotation of the power takeoff shaft is such as to produce torque tending to swing the arms in the direction of swinging movement produced by the weight of the arms. If the direction of rotation of the power takeoff shaft produces torque in the opposite direction, the weight of the arms overcomes the swinging force of this torque.

By supporting the platform carrying arms on the drive pulley, most of the weight and torque forces of the system are localized at the drive pulley which is advantageous from the standpoint of maintaining alignment of the drive pulley and driven pulley.

It should be understood that in lieu of pulleys and belts, sprockets and chain drives may be used, one sprocket being supported on the power takeoff shaft and with a boss on which is journalled the arm which supports the other shaft.

While the collars of the supporting arms are disclosed as journalled in contact with their supporting bosses, ball or other bearings may be provided between the collars and bosses.

Whereas we have shown and described several operative forms of the invention it should be understood that showing and description thereof should be taken in an illustrative or diagrammatical sense only. There are many modifications in and to the invention which will fall within the scope and spirit thereof and which will be apparent to those skilled in the art. The scope of the invention should be limited only by the scope of the hereinafter appended claims.

We claim:

1. A speed changing assembly for transmissions having a power takeoff shaft comprising a power takeoff shaft and power means for rotating it, a rotatable driven member having an internal fitting positioned on said shaft and fixed thereto, means carried by said driven member and engageable with said shaft for preventing axial displacement of said rotatable driven member along said shaft, said rotatable driven member having a boss on one side thereof, a power receiving driven member and means for supporting it laterally of said rotatable member, said supporting means including a supporting arm journalled on said boss to allow relative rotation of said boss and arm, means preventing axial displacement of said arm along said boss, means carried by said arm for preventing swinging movement of said arm relative to the axis of said boss and rotatable driven member while allowing rotation of said boss relative to said arm, and means transmitting motion from said rotatable driven member to said power receiving member.

2. A speed changing assembly for splined power takeoff shafts including a pulley having an internally splined fitting for receiving a splined power takeoff shaft therein, means for preventing axial displacement of said pulley relative to its splined driving shaft, said pulley having a boss on one side thereof and an arm journalled on said boss for relative rotation of said boss and arm, means preventing axial displacement of said arm on said boss, said arm extending radially from said boss and a second pulley rotatably supported on said arm and aligned with said first named pulley, a drive belt extending around both pulleys, and means carried by said arm for preventing swinging movement of said arm on said boss.

3. The structure of claim 2 wherein said means preventing axial displacement of said arm on said boss includes a shoulder on said boss and a lock nut spaced from said shoulder.

4. The structure of claim 2 wherein each of said pulleys is a multiple sheave pulley.

5. A speed changing assembly for unitary attachment to and removal from power take-off shafts including a drive pulley having a bore formed and adapted to be received over a power takeoff shaft and be fixed thereto, a driven pulley positioned on a supporting arm, said drive pulley having a boss at one side thereof, said arm being swingably mounted on said boss, means carried by said arm for preventing swinging movement of said arm, said arm having a platform portion adjacent said driven pulley, said platform portion being formed and adapted to support a mechanism driven by said driven pulley, and a belt interconnecting said pulleys, the weight of said arm being supported by said boss and said means.

6. A speed changing assembly for power takeoff shafts including a drive pulley having a bore formed and adapted to be received over a power takeoff shaft and be fixed thereto, a supporting arm journalled on a boss on one side of said drive pulley and extending generally radially from said bore, a driven pulley supported for rotation on said arm at a point spaced from said drive pulley, said pulleys having different diameters to enable speed changes, a belt interconnecting said pulleys, stop means carried by said arm for preventing swinging movement of said arm in one direction induced by the weight of said arm while allowing swinging movement in the other direction, a portion of the weight of said arm and driven pulley being received on said boss while the remaining weight of said arm and driven pulley is received by said stop means, the torque on said arm developed during rotation of said drive pulley and tending to rotate said arm in the direction of rotation induced by the weight of said arm being opposed by said stop means.

7. The structure of claim 6 wherein said supporting arm extends radially from said bore in opposite directions from said bore and said driven pulley is supported on one portion of said arm at a position laterally of said bore on one side thereof, and a second driven pulley is supported for rotation on said arm at a position laterally of and on the other side of said bore, said second driven pulley being driven from a belt leading from said drive pulley.

8. The structure of claim 6 wherein said stop means is in the form of an abutment adapted to contact a surface which is fixed with relation to the axis of said drive pulley.

9. The structure of said claim 6 wherein said stop means is in the form of a chain connected to said arm and a member fixed with respect to the axis of rotation of said drive pulley.

10. The structure of claim 6 wherein said drive pulley has a splined bore adapted to be fixed to a splined power takeoff shaft.

11. A speed changing assembly for power takeoff shafts including a rotatable drive member having a bore formed and adapted to be received over a power takeoff shaft and be fixed thereto, a supporting arm journalled on a boss on one side of said drive member and extending generally radially from said bore, said supporting arm having a platform portion spaced from said bore and a mechanism supported on said platform, said mechanism having a driven member, means driving said driven member from said drive member, stop means preventing swinging movement from said arm in one direction induced by the weight of said arm while allowing swinging movement in the other direction, a portion of the weight of said arm and mechanism being received on said boss while the remaining weight of said arm and mechanism is received by said stop means, the torque on said arm developed during rotation of said drive member and tending to rotate said arm in the direction of rotation induced by the weight of said arm being opposed by said stop means.

12. The structure of claim 11 wherein said mechanism is adjustably supported on said platform for adjustment in directions parallel to the axis of said rotatable drive member and in directions perpendicular to the axis of said rotatable drive member.

References Cited in the file of this patent
UNITED STATES PATENTS

| | | |
|---|---|---|
| 115,600 | Gilmore et al. | June 6, 1871 |
| 572,098 | Bendit | Dec. 1, 1896 |
| 984,953 | Matthews | Feb. 21, 1911 |
| 1,205,288 | Thomas | Nov. 21, 1916 |
| 1,612,043 | Nonneman | Dec. 28, 1926 |
| 2,005,122 | Young et al. | June 18, 1935 |
| 2,550,012 | Krafka | Apr. 24, 1951 |